May 31, 1955 M. RESK 2,709,560
CAMERA SUPPORT
Filed March 25, 1949
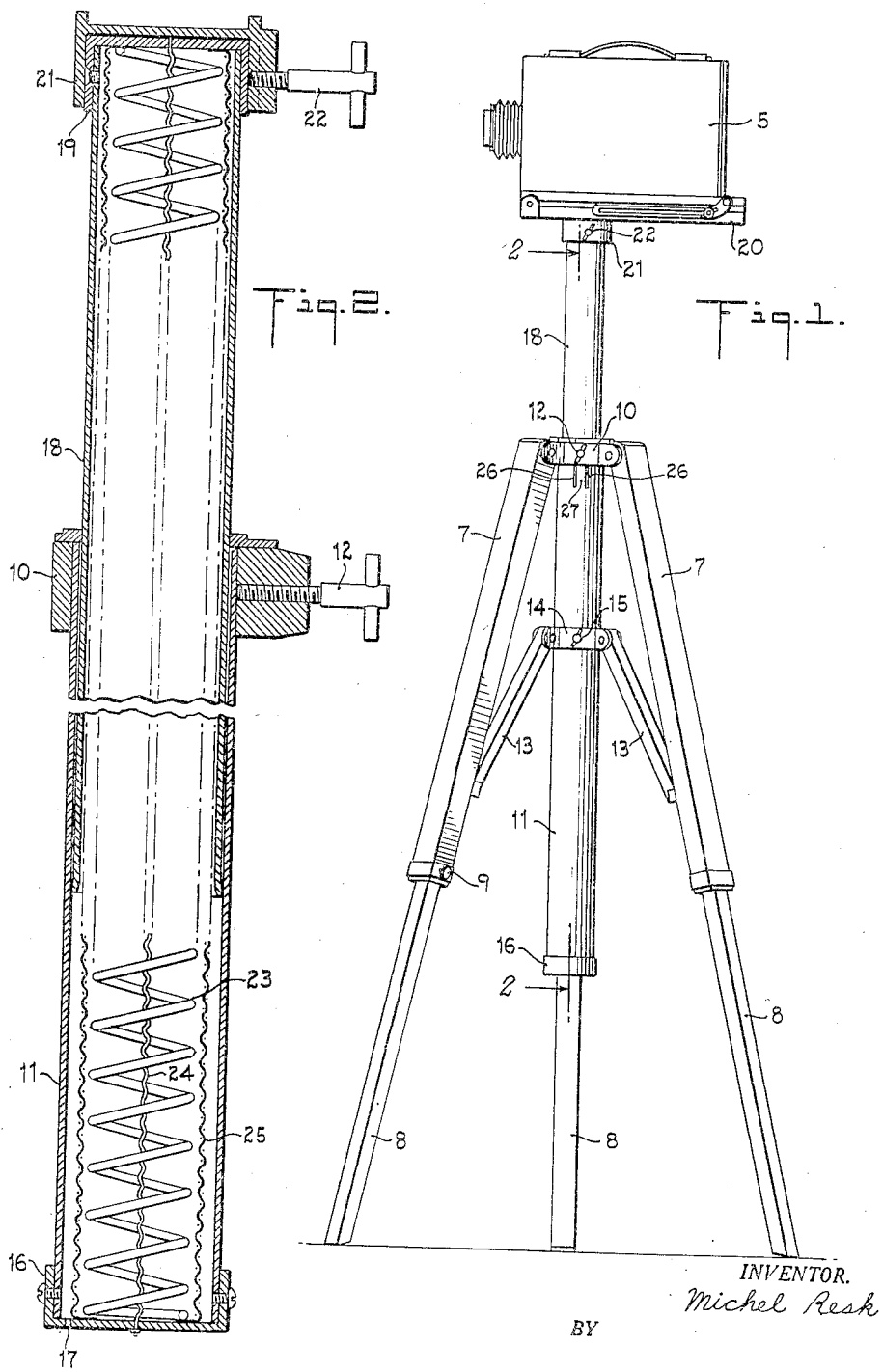
INVENTOR.
Michel Resk
BY
Dale A. Bauer
ATTORNEY United States Patent Office 2,709,560
Patented May 31, 1955

2,709,560

CAMERA SUPPORT

Michel Resk, New Rochelle, N. Y.

Application March 25, 1949, Serial No. 83,370

2 Claims. (Cl. 248—169)

This invention relates to camera supporting apparatus and more particularly to apparatus whereby a camera may be supported at variable heights above the ground.

Cameras have been heretofore mounted on tripods or similar supports whereby the same may be vertically adjusted to desired levels. With the prior known constructions it is most difficult to adjust the camera, particularly a heavy one weighing fifteen to twenty pounds or more, to a desired height, and more difficult yet to obtain accuracy of adjustment. In the operation of these known structures it is necessary that the effort of the operator overcome or control the weight of the camera and the movable parts of the support and overcome or compensate for the varying friction between the relatively moving parts or the suction or compression created by such relative movement.

It is accordingly one of the objects of the present invention to provide novel apparatus for supporting a camera whereby the same may be yieldably supported in a relatively floating position intermediate its extreme upper and lower positions so that the same may be easily raised or lowered with only a small amount of effort applied in the direction of desired movement.

Another object of the invention is to provide supporting apparatus of the above character which is extremely simple both in construction and operation, and which may be fabricated at relatively low cost.

Still another object is to provide a camera supporting structure which may be operated by inexperienced or careless operators without danger of damaging the camera by shock or the like.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like references refer to like parts throughout the several views, Fig. 1 is a side elevation illustrating one embodiment of the invention with a camera mounted thereon; and Fig. 2 is a sectional view on an enlarged scale and with parts broken away, the section being taken substantially on line 2—2 of Fig. 1.

A single embodiment of the invention is illustrated in the accompanying drawings by way of example in the form of a tripod support for a camera 5. The supporting frame or structure comprises three legs, each of which is constituted by two telescoping rectangular tubes 7 and 8 that may be secured together in any desired extended position by suitable means, such as thumb screws 9. The upper ends of tubes 7 are pivotally secured to a collar 10 which is in turn rigidly secured in any suitable manner to hollow cylindrical tube 11 adjacent the upper end thereof. Said collar also serves as a nut for a thumb screw 12 that is provided for a purpose to be hereinafter described. The lower ends of the legs 7, 8 are guided and held in desired diverging positions by braces 13, each of which is pivotally fastened to a tube 7 and to a collar 14 surrounding cylinder 11. Said collar is slidably mounted on tube 11 and may be secured in desired position thereon by a thumb screw 15.

Cylindrical tube 11 is thus vertically supported in a position determined by the extension of legs 7, 8 and the angular position thereof with respect to the vertical. This tube is preferably closed at its lower end by a cover 16 which may have a small air bleed 17 therein. The bleed hole may be of any desired size, and if desired, may be in the wall of tube 11. Its purpose will be hereinafter described.

Slidably and telescopically fitting into tube 11 is a second cylindrical tube 18, the lower end of which is open and the upper end of which is closed by suitable means, such as a cover or cap 19. A suitable platform 20 for the camera is provided with a hollow hub portion 21 that receives the upper end of tube 18, 19. A thumb screw 22 is provided in hub 21 for securing the platform in a suitable angular position on the supporting structure.

For the purpose of supporting the camera in a floating position, suitable resilient means is provided for extending the telescoping tubes 11 and 18. As shown, said means consists of a single coil spring 23 which is under axial compression between the closed or covered ends of said tubes. The compression of the spring is sufficiently great so that when unassisted, it will support the combined weight of the camera, platform, and tube 18 in a position intermediate the upper and lower limits of the movement of said tube. In the embodiment shown, these limits are determined, respectively, by a wire or cord 24 attached to both covers 16 and 19 and by the engagement of cover 19 with the upper end of the outer tube 11. It will be understood that other suitable stop means known to the art for limiting the relative movement of tubes 11 and 18 may be utilized in lieu of those illustrated by way of example. Spring 23 is preferably surrounded by a flexible covering 25 which may be made of canvas or similar material.

When the parts are in the position illustrated in the drawings, the movable parts and camera are in effect floating, the compression of spring 23 being equal to the combined weights of said parts. If it is desired to lift the camera higher, a slight effort by the operator is added to the continuous effort of the spring, it being unnecessary to lift the entire weight of the parts because of the compression of the spring. If it is desired to lower the camera from its floating or mid-position, the operator need only apply a slight downward pressure sufficient to compress the spring. This effort will be considerably less and far easier to control than that required in structures wherein the entire weight of the camera and movable parts must be supported by the operator when the camera is lowered. It is thus an easy matter to accurately adjust the camera in a vertical direction with little or no danger of disturbing the position of the rest of the supporting structure. With constructions heretofore known, it is virtually impossible to avoid moving the whole supporting structure when an adjustment is being effected.

Suitable means may be provided for securing the movable parts in adjusted position and in the form shown; this result is accomplished by frictional means. The upper end of tube 11 is slotted at 26, 26 to provide a flexible tongue 27 which is engageable by the inner end of thumb screw 12. When the latter is screwed inwardly it presses tongue 27 into frictional contact with tube 18 to thereby lock tubes 11 and 18 against relative longitudinal or angular movement.

Tube 18 preferably has a relatively close fit in tube 11, and communication between the atmosphere and the space inside the tubes may be through the relatively small bleed hole 17 which may be suitably located in either tube. Thus, during extension of the two tubes a vacuum will be created in the space therein, whereas during retraction of the tubes the air in said space is compressed. Too rapid movement of the camera or movable parts of the support in either direction by either the spring or the operator may thus be prevented. It will be understood, however, that bleed hole 17 may be of any desired size and may in fact be sufficiently large to eliminate any vacuum or compression effect during normal operation.

There is thus provided a novel camera support which is simple and rugged in construction and which may be easily and safely operated by inexperienced personnel. The novel construction also permits ease of operation in either direction, as well as easy and accurate vertical and angular adjustment of the camera. The inherent functioning of the apparatus provided by this invention guards against damage from shock or the like which might otherwise be caused by human inadvertence or carelessness.

Although only a single embodiment of the invention is illustrated and described in the accompanying drawings and the foregoing specification, it is to be expressly understood that the invention is not restricted to the particular details of the construction illustrated. For example, a short length of plastic or composition tubing could be fitted into tube 18 in lieu of flexible covering 25 for the purpose of reducing the noise which might otherwise be created by contact between the spring and the metal tubes 11, 18. Various changes may be made in the design and arrangement of parts illustrated without departing from the spirit and scope of the invention, as will now be apparent to those skilled in the art. For a definition of the limits of the invention, reference is had primarily to the appended claims.

What is claimed is:

1. A supporting structure for a camera or the like comprising a pair of hollow telescopically associated inner and outer metallic tubes, said tubes having closures at the remote ends thereof and said outer tube comprising a collar at the open end thereof and constituting the sole guide for said inner tube, said collar having a reduced bore portion which closely engages the outer wall surface of said inner tube, the major portions of the outer and inner wall surfaces of said inner and outer tubes, respectively, having only nominal operating clearance therebetween, a coil spring under compression within said tubes and interposed between said closures at the remote ends of the tubes for extending the latter and yieldably supporting the camera, said spring having a diameter only slightly less than the inside diameter of said inner tube and being the sole means within said tubes for imparting relative axial movement thereto, a flexible sleeve of fibrous material surrounding the spring from end to end between said spring and the inner walls of said tubes, and means for positively limiting the relative movement of said tubes by said spring, said inner tube having a slightly expanded portion adjacent the open end thereof which closely engages the inner wall surface of said outer tube and is engageable with a shoulder formed by said reduced bore portion of the collar to limit said relative movement.

2. A support for a camera or the like comprising a plurality of adjustably extensible legs pivotally secured together at one end and adapted to be moved into diverging positions, means for holding said legs in diverging relation to one another, a first hollow vertically disposed elongated tube rigidly supported by said legs, said tube being open at its upper end and closed at its lower end, a second hollow tube extending into said first tube and having a close sliding fit therein, the upper end of said second tube being closed and the lower end thereof being open, an air-bleed opening in one of said tubes, a coil spring disposed within and engaging the closed ends of said tubes under compression, said spring constituting the sole means within said tubes for imparting relative axial movement thereto, means for limiting the movement of second tube out of said first tube by said spring without otherwise appreciably resisting relative axial movement of said tubes, and a pliable sleeve of fibrous material disposed within said tubes and surrounding said spring from end to end thereof.

References Cited in the file of this patent

UNITED STATES PATENTS

| 685,160 | Marshall | Oct. 22, 1901 |
| 1,287,662 | Foster | Dec. 17, 1918 |
| 1,452,436 | Pullin | Apr. 17, 1923 |
| 1,517,825 | Bruneau | Dec. 2, 1924 |
| 1,726,817 | Franklin | Sept. 3, 1929 |
| 1,782,660 | Meyer | Nov. 25, 1930 |
| 1,999,844 | McElroy | Apr. 30, 1935 |
| 2,005,089 | Krebs | June 18, 1935 |
| 2,051,833 | Ehrlich | Aug. 25, 1936 |
| 2,142,570 | Martin | Jan. 3, 1939 |

FOREIGN PATENTS

| 55,963 | Sweden | Aug. 7, 1922 |
| 222,963 | Germany | June 9, 1910 |